US007867308B2

(12) United States Patent
Conrad

(10) Patent No.: US 7,867,308 B2
(45) Date of Patent: Jan. 11, 2011

(54) CYCLONIC ARRAY SUCH AS FOR A VACUUM CLEANER

(75) Inventor: Wayne Ernest Conrad, Hampton, CA (US)

(73) Assignee: G.B.D. Corp., Nassau (BS)

(*) Notice: Subject to any disclaimer, the term of this patent is extended or adjusted under 35 U.S.C. 154(b) by 366 days.

(21) Appl. No.: 11/953,317

(22) Filed: Dec. 10, 2007

(65) Prior Publication Data

US 2008/0172995 A1 Jul. 24, 2008

Related U.S. Application Data

(60) Provisional application No. 60/870,175, filed on Dec. 15, 2006, provisional application No. 60/884,767, filed on Jan. 12, 2007, provisional application No. 60/889,014, filed on Feb. 9, 2007.

(51) Int. Cl.
*B01D 45/12* (2006.01)

(52) U.S. Cl. .................... 55/345; 55/343; 55/346; 55/424; 55/428; 55/DIG. 3; 55/434; 15/352; 15/353

(58) Field of Classification Search .................. 55/346, 55/343, 345, DIG. 3, 424–427; 15/352, 353
See application file for complete search history.

(56) References Cited

U.S. PATENT DOCUMENTS

| | | | | |
|---|---|---|---|---|
| 3,822,533 | A * | 7/1974 | Oranje | 55/394 |
| 6,231,645 | B1 | 5/2001 | Conrad et al. | |
| 6,524,358 | B2 | 2/2003 | Yang | |
| 6,810,558 | B2 | 11/2004 | Lee | |
| 6,840,972 | B1 * | 1/2005 | Kim | 55/337 |
| 6,977,003 | B2 * | 12/2005 | Lim et al. | 55/337 |
| 7,128,770 | B2 * | 10/2006 | Oh et al. | 55/343 |
| 7,462,211 | B2 * | 12/2008 | Beech et al. | 55/343 |
| 7,488,363 | B2 * | 2/2009 | Jeong et al. | 55/337 |
| 7,645,311 | B2 * | 1/2010 | Oh et al. | 55/429 |
| 2005/0229554 | A1 * | 10/2005 | Oh et al. | 55/346 |
| 2006/0107629 | A1 * | 5/2006 | Oh | 55/345 |
| 2006/0130445 | A1 * | 6/2006 | Park et al. | 55/346 |
| 2006/0137304 | A1 * | 6/2006 | Jeong et al. | 55/337 |
| 2006/0230717 | A1 * | 10/2006 | Oh et al. | 55/343 |
| 2006/0230725 | A1 * | 10/2006 | Han et al. | 55/345 |
| 2006/0254226 | A1 * | 11/2006 | Jeon | 55/345 |
| 2007/0011997 | A1 * | 1/2007 | Han et al. | 55/337 |
| 2007/0011999 | A1 * | 1/2007 | Oh | 55/345 |
| 2007/0079581 | A1 * | 4/2007 | Kim et al. | 55/345 |
| 2007/0079586 | A1 * | 4/2007 | Kim | 55/345 |
| 2007/0084160 | A1 * | 4/2007 | Kim | 55/345 |
| 2007/0095029 | A1 * | 5/2007 | Min et al. | 55/345 |
| 2007/0214754 | A1 * | 9/2007 | Kim | 55/345 |
| 2007/0289267 | A1 * | 12/2007 | Makarov et al. | 55/345 |

* cited by examiner

*Primary Examiner*—Jason M Greene
*Assistant Examiner*—Dung Bui
(74) *Attorney, Agent, or Firm*—Bereskin & Parr LLP/S.E.N.C.R.C., s.r.l.; Philip C. Mendes da Costa

(57) ABSTRACT

A cyclonic cleaning stage for a, e.g., surface cleaning apparatus is provided. The cyclonic cleaning stage comprises a plurality of cyclones, which are integrally molded as a single body. Each cyclone has a cyclone body having an upper end, a lower end, a cyclone inlet, and a cyclone outlet. Each cyclone inlet has a top. A separately molded upper cover is mounted to the top of the single body at the upper ends. A separately molded lower cover is mounted on the single body at the lower ends of the cyclones.

21 Claims, 13 Drawing Sheets

CYCLONIC ARRAY SUCH AS FOR A VACUUM CLEANER

CROSS REFERENCES TO RELATED APPLICATIONS

This application claims priority from U.S. Provisional Patent Applications 60/870,175 (filed Dec. 15, 2006), 60/884,767, filed on Jan. 12, 2007, and 60/889,014, filed on Feb. 9, 2007, each of which is incorporated herein by reference in their entirety.

FIELD OF THE INVENTION

This invention relates to a construction for a cyclonic array for use in, for example, a surface cleaning apparatus, such as vacuum cleaners, wet/dry vacuum cleaners and carpet extractors.

BACKGROUND OF THE INVENTION

Various different constructions for a surface cleaning apparatus are known in the art. Recently, vacuum cleaners have been designed which use one, and in some cases, two cyclonic cleaning stages. In particular, vacuum cleaners have been constructed which comprise a single first stage cyclone and a plurality of second stage cyclones in parallel.

SUMMARY OF THE INVENTION

In accordance with of this invention, a construction of a cyclone array is provided which comprises three parts. Optionally, each of the cyclone chambers of the array may also have its own divider plate. These may be separately molded and inserted into one or more, and preferably each, cyclone chamber. This cyclone array may be used in any filtration application, such as surface cleaning apparatus and air cleaners.

An advantage of the construction is that a cyclone unit comprising a plurality of cyclones in parallel is easily and reliably manufactured. Preferably, each cyclone chamber has its own dirt collection chamber. Accordingly, no cross flow between adjacent cyclones is permitted via the dirt outlet of the cyclones due to varying backpressure at the cyclone inlets. This cross flow could result in separated dirt being re-entrained.

It will be appreciated that one or more cyclones could share a dirt collection chamber. Further, in one construction, there could be a single dirt collection chamber. In there is more than one dirt collection chamber, then all of the dirt collection chambers may be emptied at the same time by opening a single panel.

According to a first broad aspect of the present invention, a cyclonic cleaning unit, such as for a surface cleaning apparatus is provided. The cyclonic cleaning unit comprises a plurality of cyclones, which are integrally molded. Each cyclone has a cyclone body having an upper end, a lower end, a cyclone inlet, and a cyclone outlet. Each cyclone inlet has a top. A separately molded upper cover is mounted at the upper ends. A separately molded lower cover is mounted on the lower ends.

Embodiments in accordance with this broad aspect may be advantageous because the cyclonic cleaning unit may be manufactured from only three molded pieces. Accordingly, the cyclonic cleaning unit may be relatively easy to assemble and disassemble, and therefore relatively easy to clean or repair.

In some embodiments, the cyclonic cleaning unit may further comprise a plate positioned in each cyclone to define a cyclone chamber above the plate and a dirt chamber below the plate.

In some embodiments, each plate is separately manufactured and inserted into a cyclone.

In some embodiments, the lower cover is moveably mounted between a closed position and an open position.

In some embodiments, the plurality of cyclones includes an integrally molded plate positioned at the upper end of the cyclones. The plate provides a continuous surface other then the cyclone outlets and the top on the cyclone inlets. The upper cover has openings that align with the cyclone outlets and filler members that sealingly engage the top of the cyclone inlets.

In some embodiments, each cyclone inlet comprises a longitudinally extending opening in a sidewall of the cyclone body that extends to the top of the inlet.

In some embodiments, the filler members extend into the tops of the inlets.

In some embodiments, ribs extend between adjacent cyclones.

In some embodiments, an open volume is provided between adjacent cyclones and the open volume comprises at least one airflow passage extending to the cyclone inlets.

In some embodiments, the lower cover closes the lower end of each cyclone.

In another broad aspect, a vacuum cleaner is provided. The vacuum cleaner comprises a first cyclonic cleaning stage. The first cyclonic cleaning stage comprises a plurality of cyclones that are integrally molded. Each cyclone has an upper end, a lower end, a cyclone inlet, and a cyclone outlet. Each cyclone inlet has a top. A separately molded upper cover is mounted at the upper ends. A separately molded lower cover mounted is on the lower ends. The vacuum cleaner further comprises a dirty air inlet upstream from the cyclonic cleaning stage. A clean air outlet is provided downstream from the cyclonic cleaning stage. An airflow passage extends from the dirty air inlet to the clean air outlet and includes the cyclonic cleaning stage. The surface cleaning apparatus further comprises a suction motor.

In some embodiments, the vacuum cleaner further comprises a second cyclonic cleaning stage upstream of the first cyclonic cleaning stage. The second cyclonic cleaning stage has a cyclone outlet and the cyclone outlet is attached to the lower cover.

In some embodiments, the cyclone outlet is integrally molded with the lower cover.

In some embodiments, a plate is positioned in each cyclone to define a cyclone chamber above the plate and a dirt chamber below the plate. In further embodiments, each plate is separately manufactured and inserted into a cyclone.

In some embodiments, the lower cover is moveably mounted between a closed position and an open position.

In some embodiments, the plurality of cyclones includes an integrally molded plate positioned at the upper end of the cyclones. The plate provides a continuous surface other than the cyclone outlets and the top on the cyclone inlets. The upper cover has openings that align with the cyclone outlets and filler members that sealingly engage the top of the cyclone inlets.

In some embodiments, each cyclone inlet comprises a longitudinally extending opening in a sidewall of the cyclone body that extends to the top of the inlet.

In some embodiments, the filler members extend into the tops of the inlets.

In some embodiments, ribs extend between adjacent cyclones.

In some embodiments, an open volume is provided between adjacent cyclones and the open volume comprises at least one air flow passage extending to the cyclone inlets.

In some embodiments, the lower cover closes the lower end of each cyclone.

BRIEF DESCRIPTION OF THE DRAWINGS

These and other advantages of the instant invention will be more fully and completely understood in conjunction with the following description of a preferred embodiment of the invention in which.

DETAILED DESCRIPTION OF THE INVENTION

Figure 1:
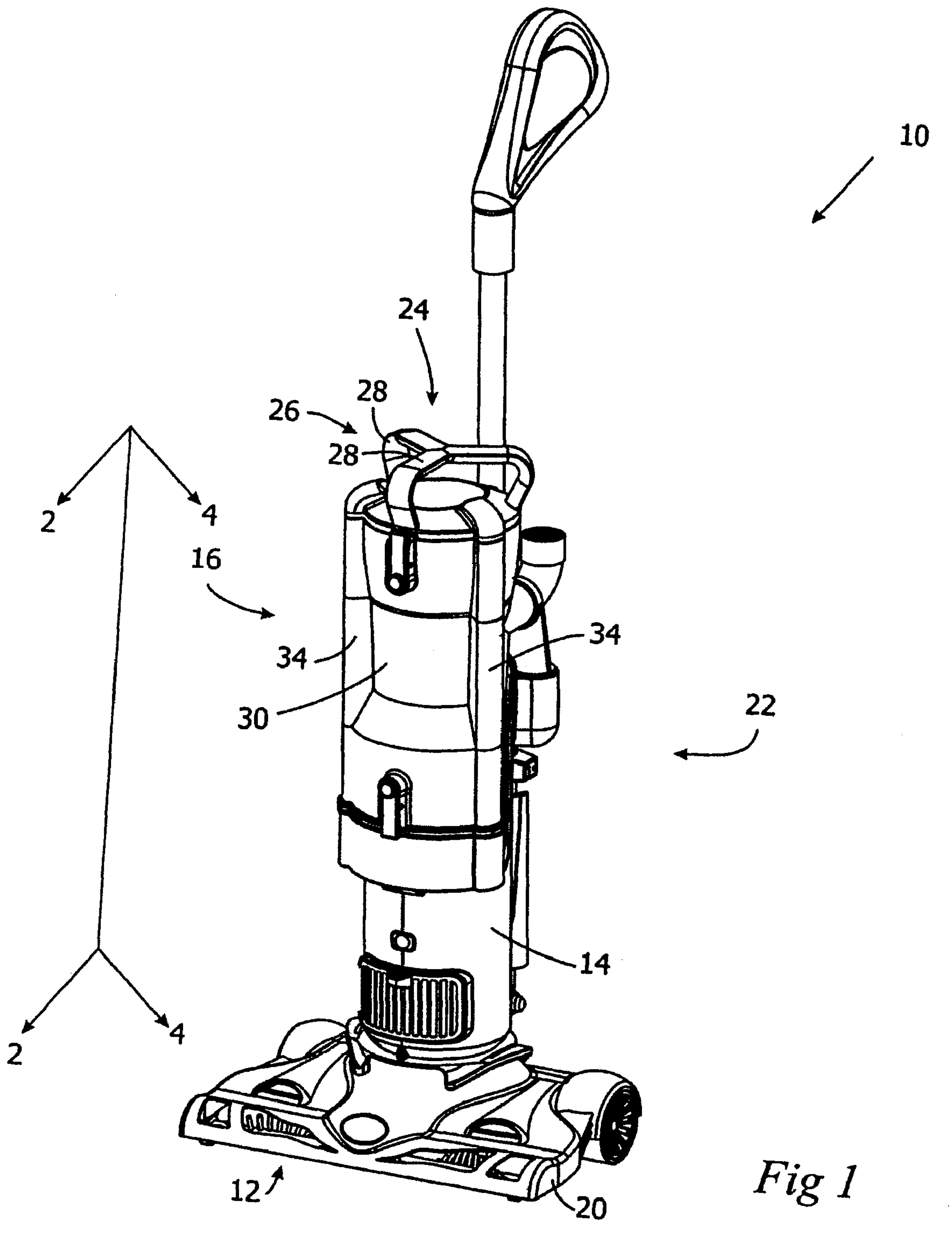
FIG. 1 is a perspective view of a vacuum cleaner that may employ a cyclonic array according to one embodiment of the instant invention.
Figure 5:
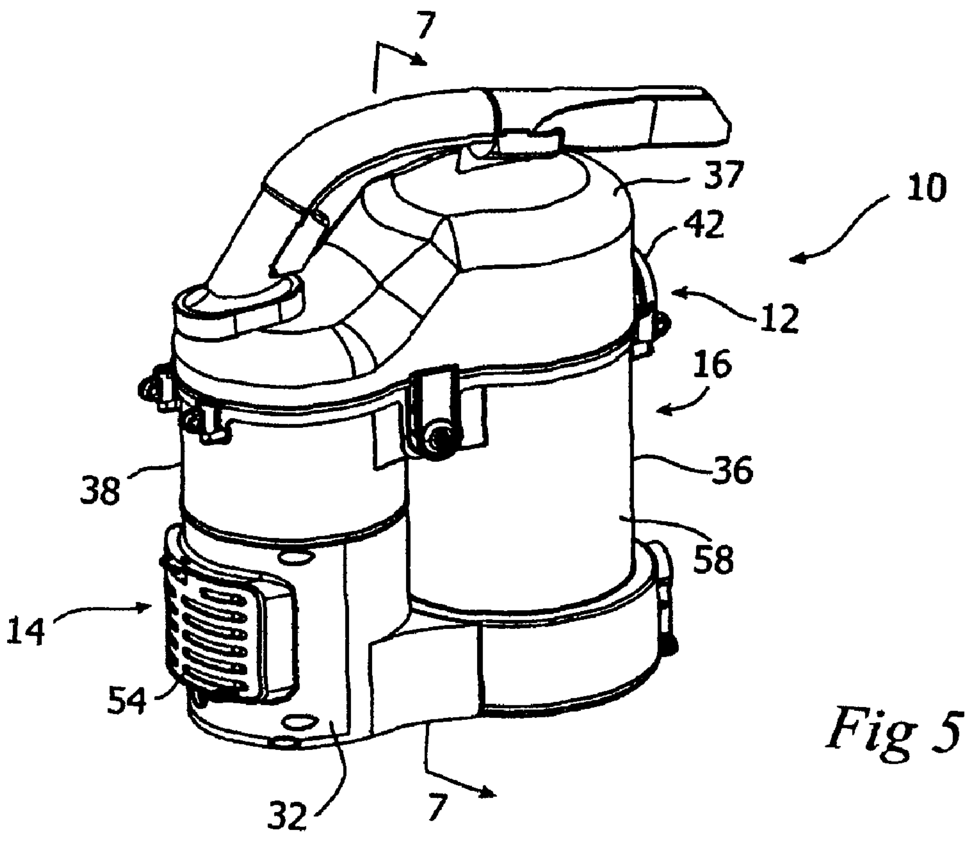
FIG. 5 is a perspective view of an alternate embodiment of a vacuum cleaner employing a cyclonic array of the present invention.
Figure 6:
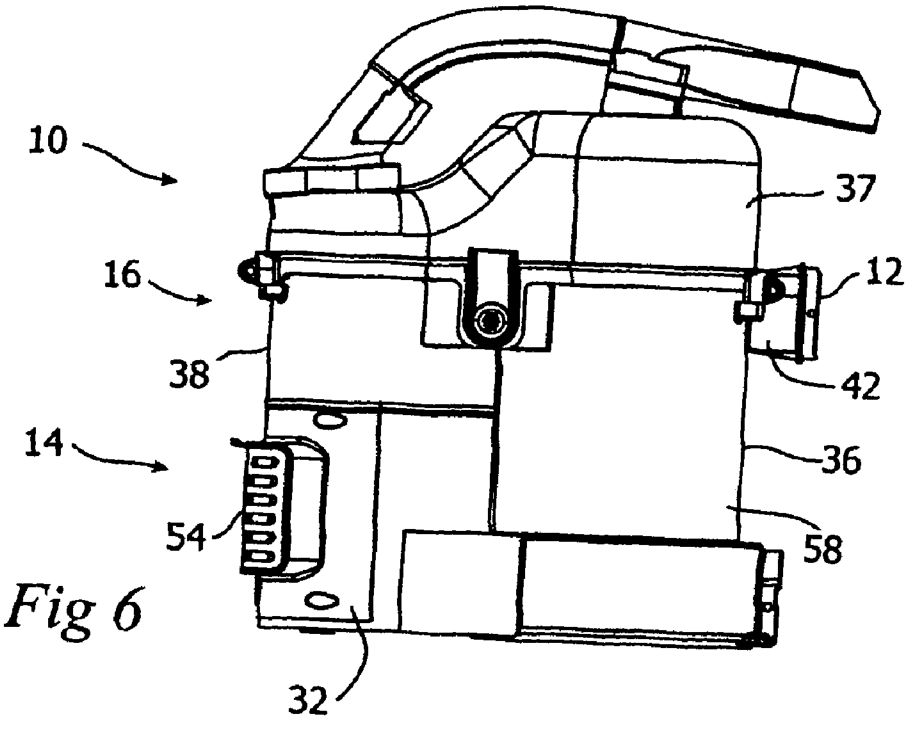
FIG. 6 is a side view of the embodiment of FIG. 5.

Embodiments of a surface cleaning apparatus 10 of the present invention are shown in FIGS. 1 and 5-6. As shown in FIG. 1, the surface cleaning apparatus 10 may be an upright vacuum cleaner. As shown in FIGS. 5 and 6, the surface cleaning apparatus 10 may be a wheel-mounted vacuum cleaner, which may be converted to a carryable vacuum cleaner. In other embodiments, the surface cleaning apparatus 10 may be another type of surface cleaning apparatus for example a canister type vacuum cleaner, a stick vacuum cleaner, a back pack vacuum cleaner, a hand-carryable vacuum cleaner, a carpet extractor or the like.

Surface cleaning apparatus 10 comprises a fluid flow path extending from a dirty fluid inlet 12 to a clean air outlet 14. A filtration unit 16 comprising at least one cyclonic cleaning stage is provided in the fluid flow path. A motor 18 is provided in the fluid flow path, for drawing fluid through the fluid flow path from the dirty fluid inlet 21 to the clean air outlet 14.

In the embodiment shown in FIG. 1, a surface cleaning apparatus 10 that is an upright surface cleaning apparatus is exemplified. Surface cleaning apparatus 10 comprises surface cleaning head 20 comprising dirty fluid inlet 12. Air, or air and/or water in the case, e.g., of a carpet extractor is directed from dirty fluid inlet 12 to an upright section 22, which is pivotally mounted to surface cleaning head 20. Upright section 22 has a top 24, which is provided with a handle 26, which has a plurality of handgrip portions 28. Accordingly, handle 26 may be used to carry the vacuum cleaner, or if upright section 22 is removed from surface cleaning head 20, to carry upright section 22. Various constructions of surface cleaning head 20 and means for pivotally connecting an upright section 22 to a surface cleaning head 20 are known and any of those may be used.

Upright section 22 includes a filtration unit 16 housed in a filtration unit housing 30, and the suction motor 18, housed in a motor housing 32. It will be appreciated that upright section 22 may be removably mounted to surface cleaning head 20, and one or both of motor housing 32 and filtration unit 16 may be removably mounted to upright section 22.

Filtration unit 16 may comprise one or more cyclonic cleaning stages, as will be described further hereinbelow, and one or more filter assemblies 48 may be positioned upstream and/or downstream therefrom. Accordingly, in this embodiment, air enters surface cleaning apparatus 10 through dirty fluid inlet 12 in surface cleaning head 20, is directed upwardly to filtration unit 16. The air exits filtration unit 16 at an upper portion thereof, and preferably enters one or more down flow tubes 34. Down flow tubes 34 direct air towards motor 18. The air passes motor 18, and is directed out of clean air outlet 14. It will be appreciated that the cyclone array provided herein may be used in any alternate embodiment for an upright surface cleaning apparatus.

Figure 7:
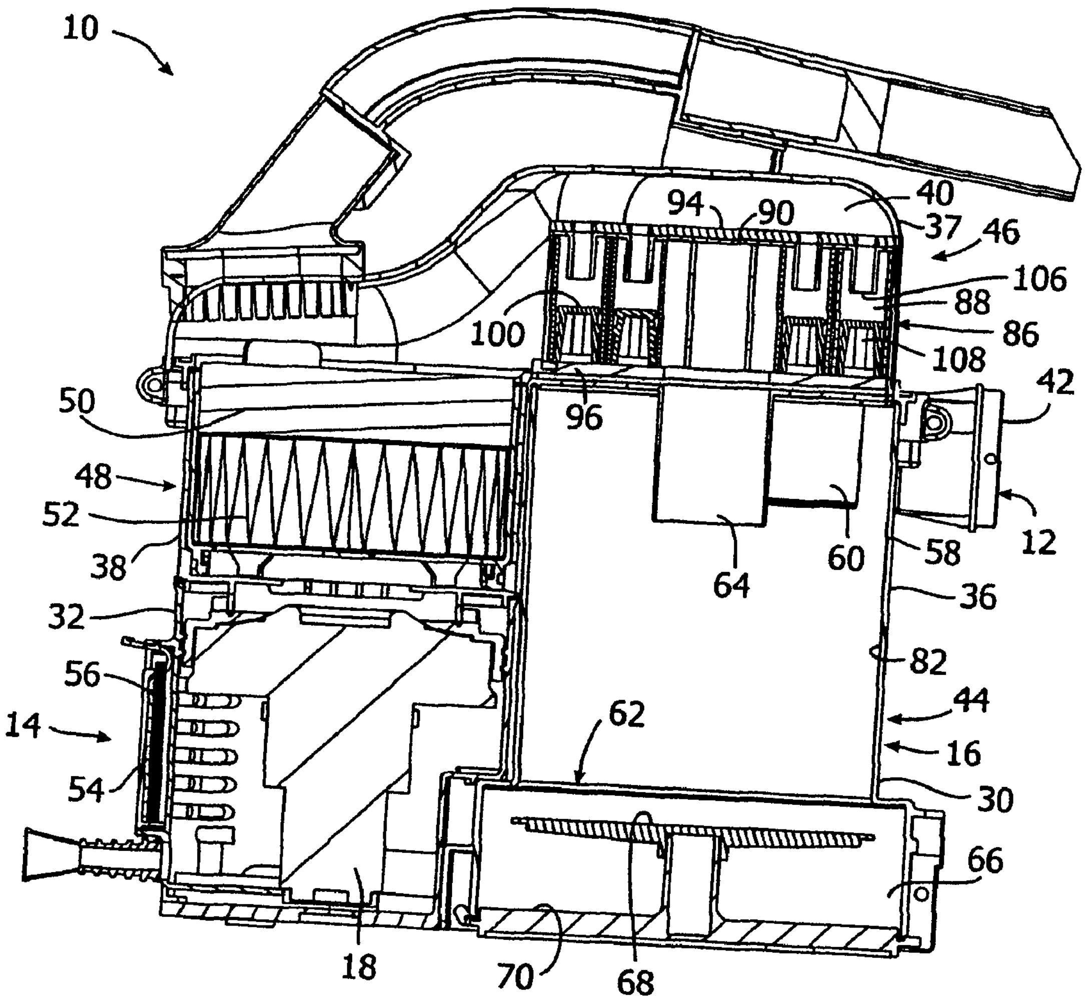
FIG. 7 is a cross section taken along line 7-7 in FIG. 5.

Referring to the embodiment shown in FIGS. 5-7, surface cleaning apparatus 10 is exemplified as a hand or strap carriable surface cleaning apparatus. Accordingly, as exemplified, surface cleaning apparatus 10 comprises first 36 and second 38 housings, which are adjacent each other. In some embodiments, first and second housings 36, 38 may be separately manufactured and then secured together, such as by a common base or by gluing, welding or mechanically securing the two housings together. Alternatively, first 36 and second 38 housings may be integrally molded. It will be appreciated that the cyclone array provided herein may be used in any alternate embodiment of a hand or strap carriable surface cleaning apparatus, or in fact any surface cleaning apparatus.

In the embodiment exemplified in FIGS. 5-7, filtration unit 32 comprises 2 cyclonic cleaning stages, 44, 46, as will be described further hereinbelow, and a filter assembly 48. The cyclonic cleaning stages 44, 46, are housed in first housing 36, and the filter assembly 48 is housed in second housing 38. An airflow passage 40 is provided between the cyclonic cleaning stages in first housing 36, and the filter assembly in second housing 38. Suction motor 18 is additionally housed in second housing 38. Dirty fluid inlet 12 is provided by a nozzle 42, extending from first housing 36. Nozzle 42 may be coupled to a ground engaging head or cleaning tool by, for example, a flexible hose, as is known in the vacuum cleaner art.

Accordingly, in the embodiment of FIGS. 5-7, air enters surface cleaning apparatus 10 via dirty fluid inlet 12, and is directed through filtration unit 16 by passing through second cleaning stage 44, through first cleaning stage 46, and into airflow passage 40. The air then travels downwardly into second housing 14 through filter assembly 48, which preferably includes foam filter 50 and material filter 52 (e.g. an air filter such as may be utilized for an engine for a car or a HEPA filter) in a housing 51 (shown in FIG. 15) and the suction motor 18. Subsequent to passing by suction motor 18, the air may exit second housing 38 via clean air outlet 14, which is provided by one or more openings in second housing 38 (e.g.

grill 54). If a post motor filter is desired, then grill 54 may be openable or removable to reveal a filter 56, which may be positioned between second housing 38 and grill 54. Preferably, filter 56 is removable for cleaning or replacement.

It will be appreciated that in alternate embodiments, no filters may be provided in surface cleaning apparatus 10. Alternately, only one filter, or more than two filters, may be provided.

Referring to FIGS. 2-4, and 7, in the embodiments shown, surface cleaning apparatus 10 comprises a first cleaning stage 46, and a second cleaning stage 44 positioned upstream from first cleaning stage. In other embodiments, surface cleaning apparatus may comprise only first cleaning stage, or may comprise additional cleaning stages. Furthermore, in the embodiments shown, first cleaning stage 46 is positioned above second cleaning stage 44. In alternate embodiments, first 46 and second 44 cleaning stages may be otherwise positioned. For example, first cleaning stage 46 maybe provided adjacent second cleaning stage 44.

It will be appreciated that if more than they cyclonic array is used, then the additional cleaning stages may be any that are known in the particular application. If used in a vacuum cleaner, preferably a cyclonic stage, comprising only one cyclone, but optionally more than one cyclone, is used upstream of the cyclone array. For example in the embodiments shown, dirty fluid is directed from dirty fluid inlet 12 to second cleaning stage 44. Second cleaning stage comprises a single cyclone chamber 58 having an air inlet 60, a dirt outlet 62, and an air outlet 64. A dirt collection chamber 66 is positioned below dirt outlet 64, for collecting dirt separated from the fluid in cyclone chamber 58. In the embodiments shown, a plate 68 is positioned adjacent dirt outlet. Particulate matter, which is separated from the air stream as the air stream travels in a cyclonic pattern in cyclone chamber 58, travels downwardly and is collected beneath plate 68 in dirt collection chamber 66. The air then travels upwardly to exit cyclone chamber 58 via air outlet 60.

Dirt collection chamber 66 may be emptied by any suitable means known in the art. For example, in the embodiment of FIG. 4, dirt collection chamber may be emptied by removing filtration unit 16 from surface cleaning apparatus 10, and pushing button 70 which releases latch 72 permitting bottom 74 to pivot open about pivot pin 76. In the embodiment of FIG. 7, dirt collection chamber 66 may be emptied by opening bottom 78, which may be hinged to first 36 or second 38 housing such that bottom 78, and, preferably plate 68, both pivot to a generally vertical position so as to permit dirt to fall out of chamber 66 into, e.g., a trash receptacle. Bottom 78 may then be secured in the closed position shown by any means known in the art. It will be appreciated that dirt collection chamber 66 may alternately be emptied by any means known in the art. For example, dirt collection chamber 66 may be removably mounted to the surface cleaning apparatus either alone or together with the cyclone chamber or chambers associated therewith.

Figure 2:
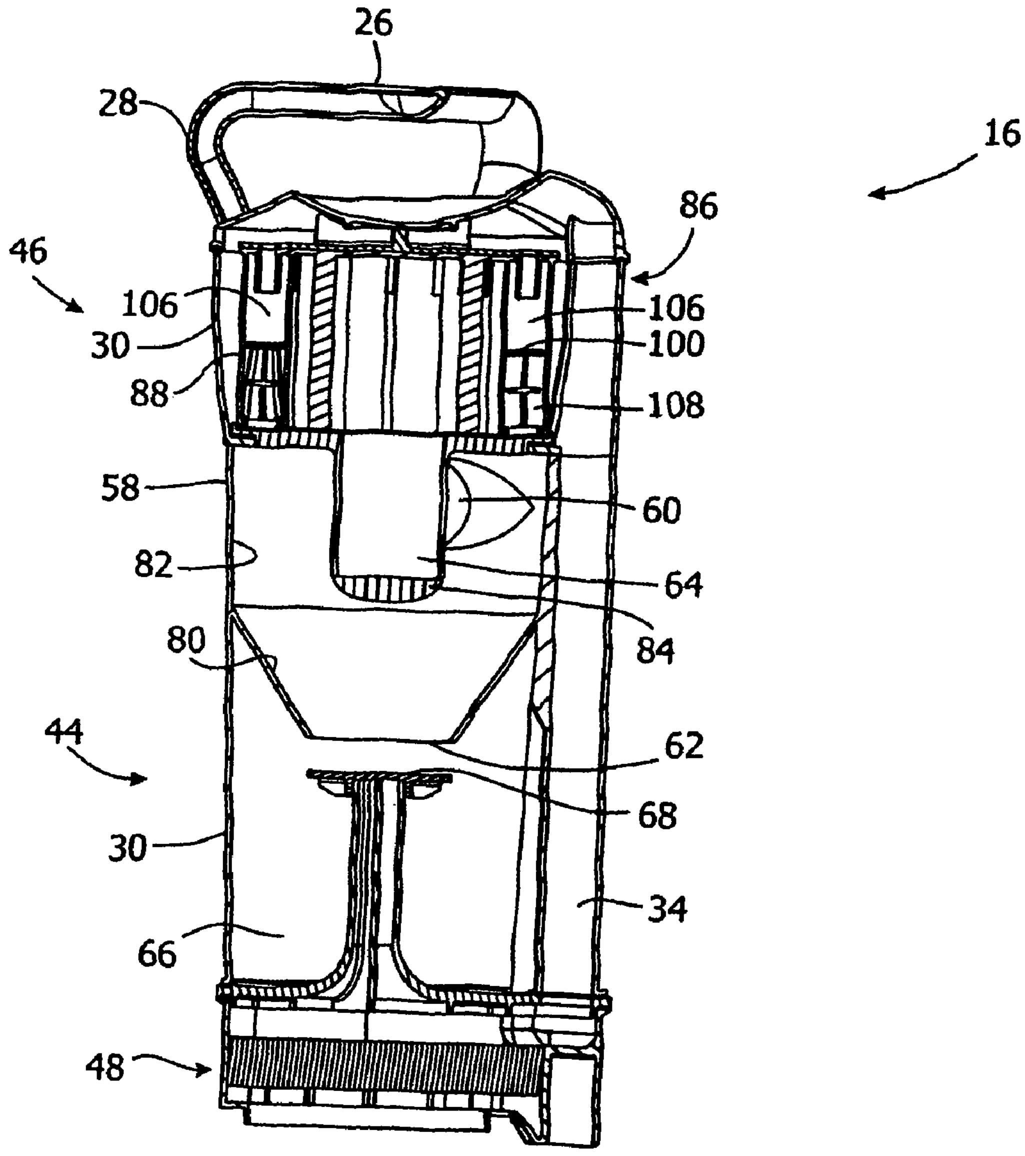
FIG. 2 is a cross section through the upright section of the vacuum cleaner along the line 2-2 of FIG. 1.
Figure 3:
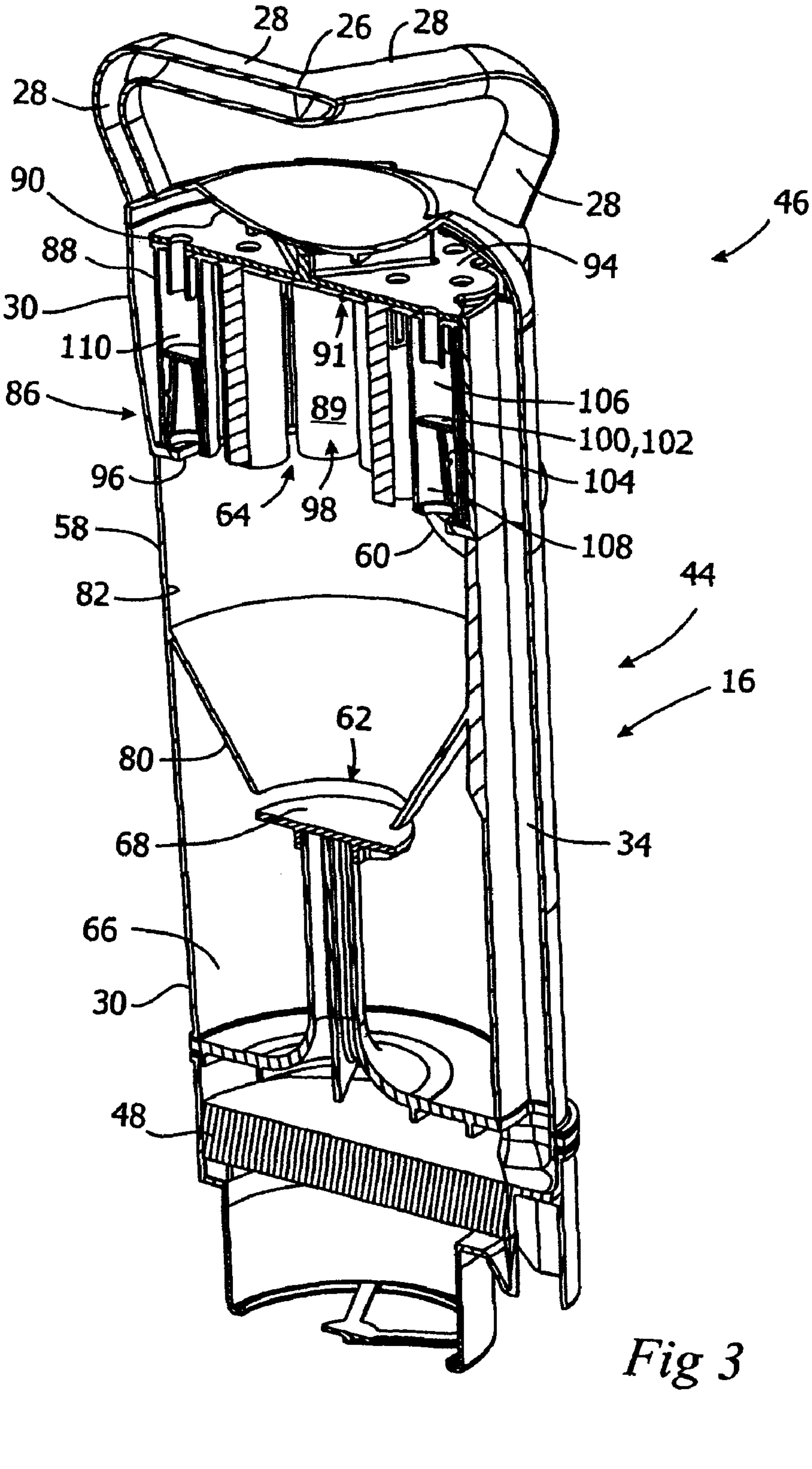
FIG. 3 is a perspective view of the cross section of FIG. 2.
Figure 4:
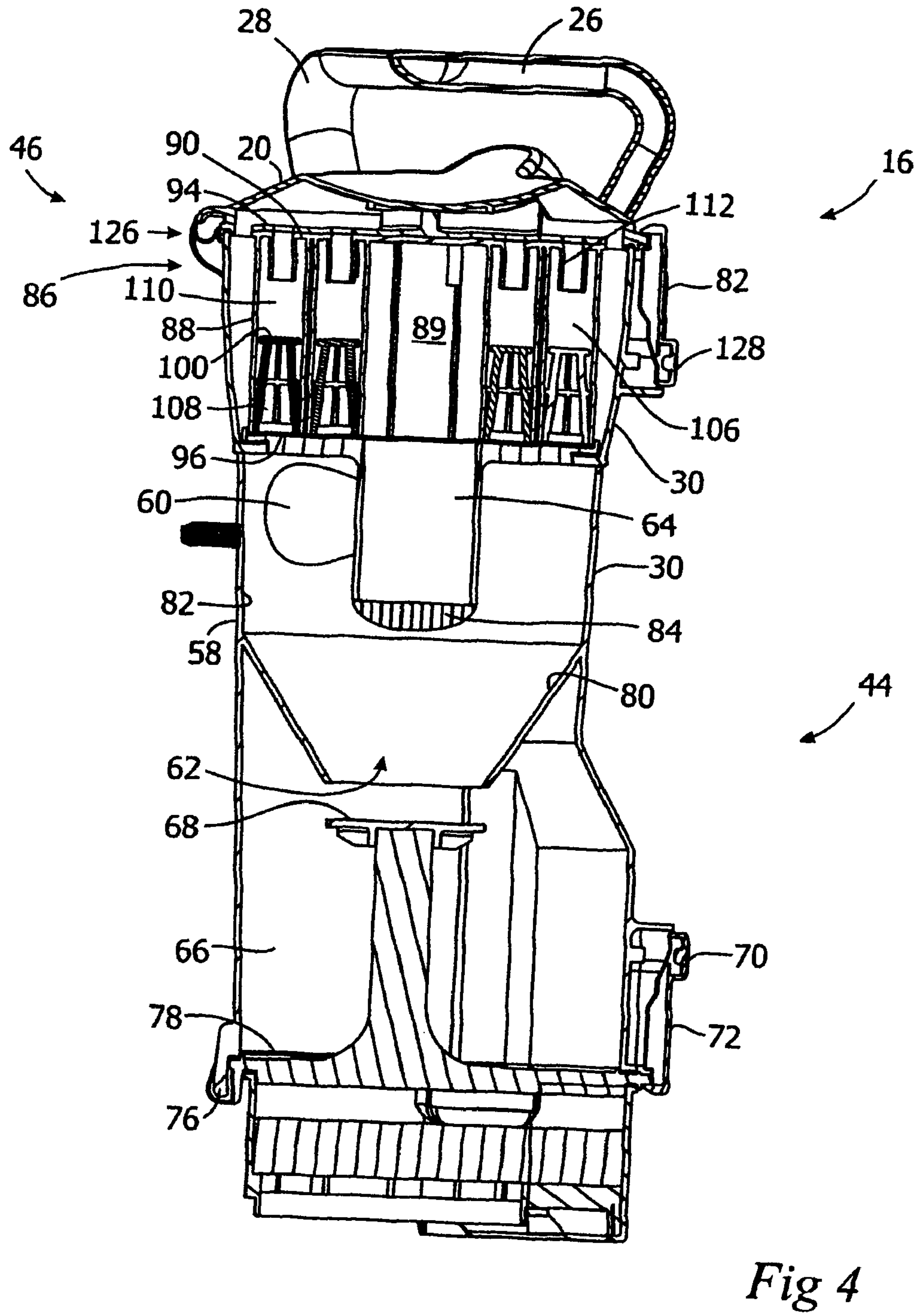
FIG. 4 is a cross section along the line 4-4 shown in FIG. 1.

In some embodiments, a flow director 80 may be optionally provided in cyclone chamber 58. For example, as shown in FIG. 2-4, flow director 80 comprises an inverted cone extending downwardly and inwardly from the inner wall 82 of cyclone chamber 58. Accordingly, dirt travels downwardly along flow director 80 to cone opening dirt outlet 62, and passes into dirt collection chamber 66.

In some embodiments, a filter or a screen may be associated with air outlet 64. For example, as shown in FIGS. 2 and 4, a screen 84 may be at air outlet 64. Alternately, a cylindrical housing may be mounted on cyclone outlet and may have a plurality of openings, which are provided with a screen (e.g. a wire mesh). Any such construction known in the art may be used.

From air outlet 64, air passes into first cleaning stage 46, which, in the embodiments shown, is preferably above second cleaning stage 44.

First cleaning stage 44 comprises a cyclonic array 86 including a plurality of cyclones 88 in parallel. The array may include any desired number of cyclones. As shown in FIGS. 8-13, each second stage cyclone comprises a cyclone body 89 having an upper end 91 and a lower end 98.

In the embodiments shown, the cyclonic array 86 includes an integrally molded top plate 90 positioned at the upper ends 91 of the cyclones, which provides a continuous surface (other than cyclone outlets 114 and the top 118 on the cyclone inlets, as will be discussed hereinbelow). In alternate embodiments, top plate 90 may not be provided. An open volume 93 is provided between adjacent cyclone bodies 89, and ribs 92 extend between adjacent cyclone bodies 89 for connecting adjacent cyclones.

A lower cover 96 is movably mounted to the lower ends 98 of cyclones 88 and upper cover 94 is mounted at the upper ends of cyclones 88, at top plate 90. A plurality of inserts 100, which have a plate 102 mounted on legs 104, are preferably provided so as to divide each second stage cyclone 88 into an upper cyclone chamber 106 and a lower dirt chamber 108. Accordingly, dirt enters dirt chamber 108 via annular gap 110 (see FIG. 10).

Top plate 90 if provided and second stage cyclones 88 may be integrally molded as a single unit. Accordingly, cyclonic array 86 may be constructed from three separate molds, namely upper cover 94, lower cover 96 and the mold for plate 90 and second stage cyclones 88. It will be appreciated that a separate mold will be required for inserts 100. Accordingly the cyclone bodies are molded as a single item and upper cover 94 and lower cover 96 are separately molded. If no divider plates are desired, then the cyclone array may be manufactured from three molded parts.

Figure 8:
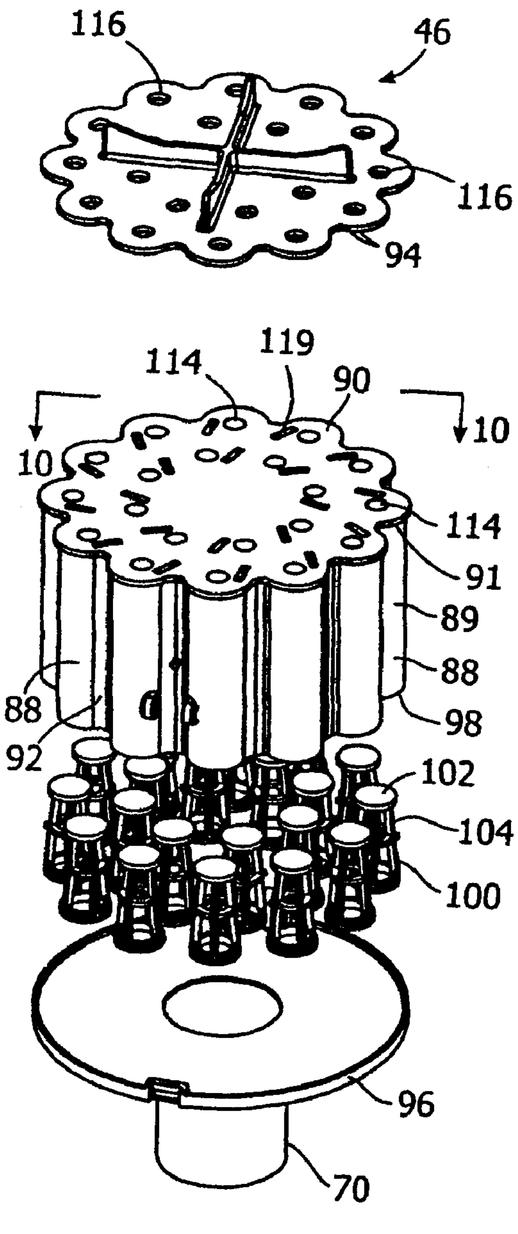
FIG. 8 is a perspective, exploded view from above of a cyclonic array in accordance with the instant invention.
Figure 9:
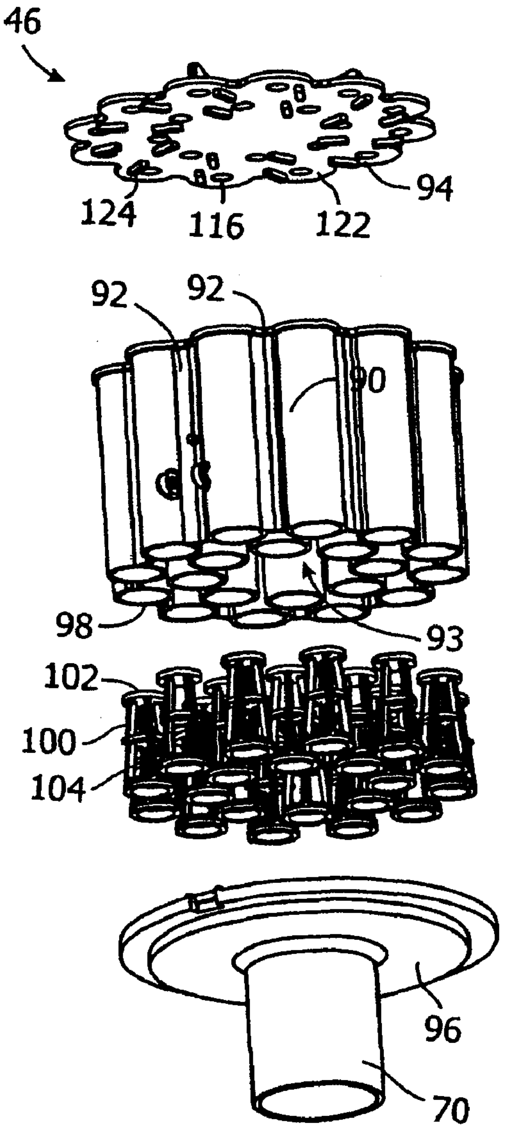
FIG. 9 is a perspective exploded view from below of the cyclonic array of FIG. 8.
Figure 10:
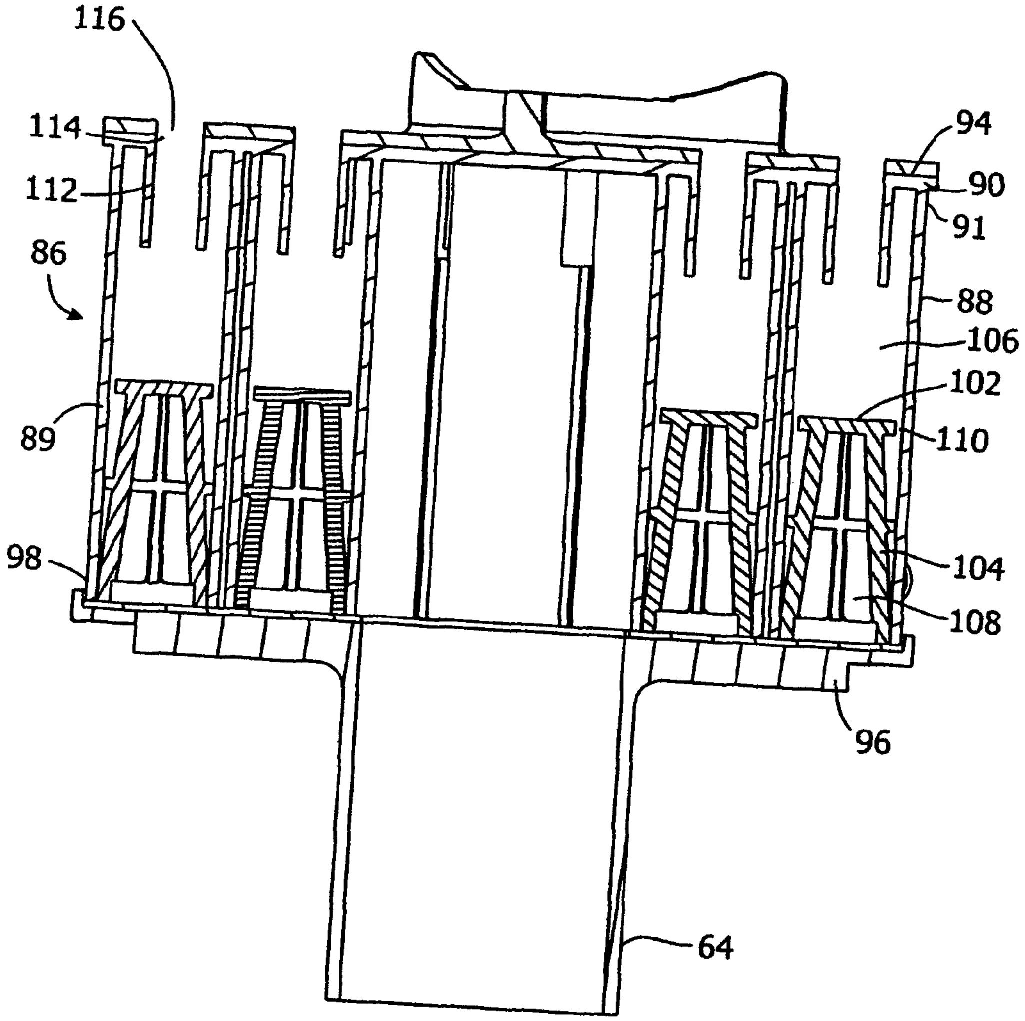
FIG. 10 is a cross-section along the line 10-10 of FIG. 8.
Figure 11:
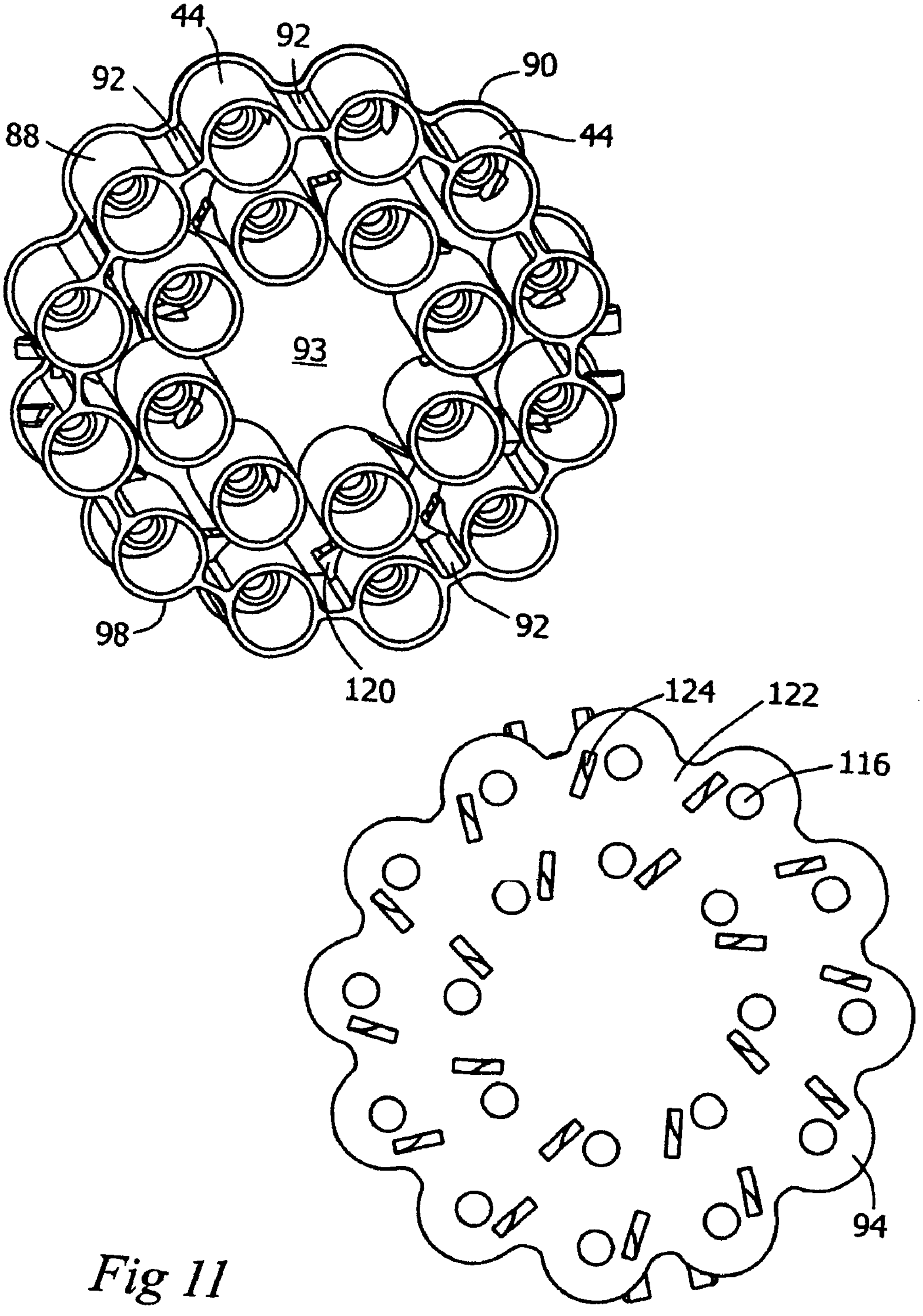
FIG. 11 is a exploded perspective view showing the bottom of the cyclonic array and the upper cover.
Figure 12:
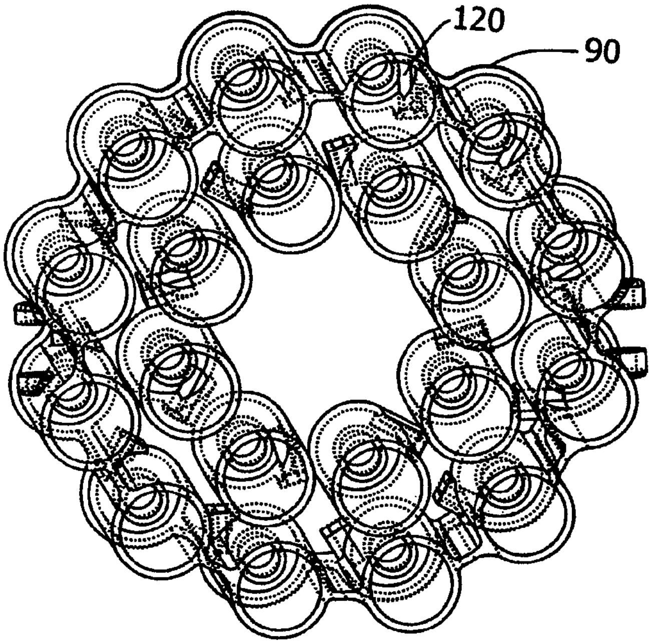
FIG. 12 is a perspective view from above of the cyclonic array and the upper cover.
Figure 12:
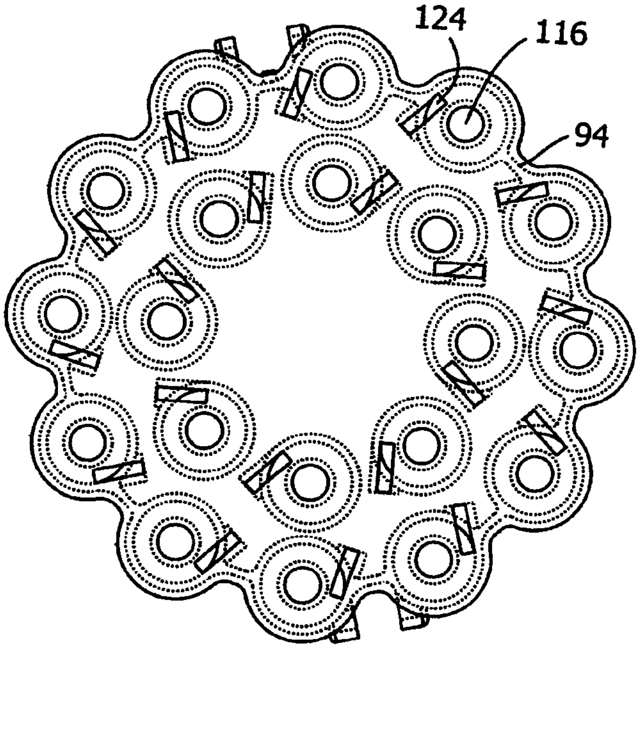

As shown in FIGS. 8-10, outlet 64 from the second cyclonic stage 44 (or the vortex finder) may be integrally molded as part of lower cover 96, and is preferably so manufactured. It will be appreciated that outlet 64 may be separately manufactured and subsequently secured to the lower surface of lower cover 96 by any means known in the art, such as welding, an adhesive or a mechanical fastener or a combination thereof.

Lower cover 96 is preferably movably mounted and, more preferably pivotally mounted, to second stage cyclones 88. Accordingly, when in a closed position (see FIG. 10), lower cover 96 closes the bottom of each second stage lower dirt chamber 108. When pivoted open, each of chambers 108 may be emptied. It will be appreciated that lower cover need not be a plate but may be an open topped container (e.g. having a generally flat bottom and sidewalls that seal with the outer perimeter of cyclones 88). Accordingly, the cyclone array may have a single dirt collection chamber. It will be appreciated that inner walls may be provided to such a construction so that a plurality of dirt collection chambers are provided.

Second stage cyclones 88 have an outlet 112, which is aligned with openings 114 in top plate 90 and openings 116 in upper cover 94 (see FIG. 10). Outlet 112 is in fluid communication with components downstream from cyclonic array 86, such as motor 18.

Figure 13:
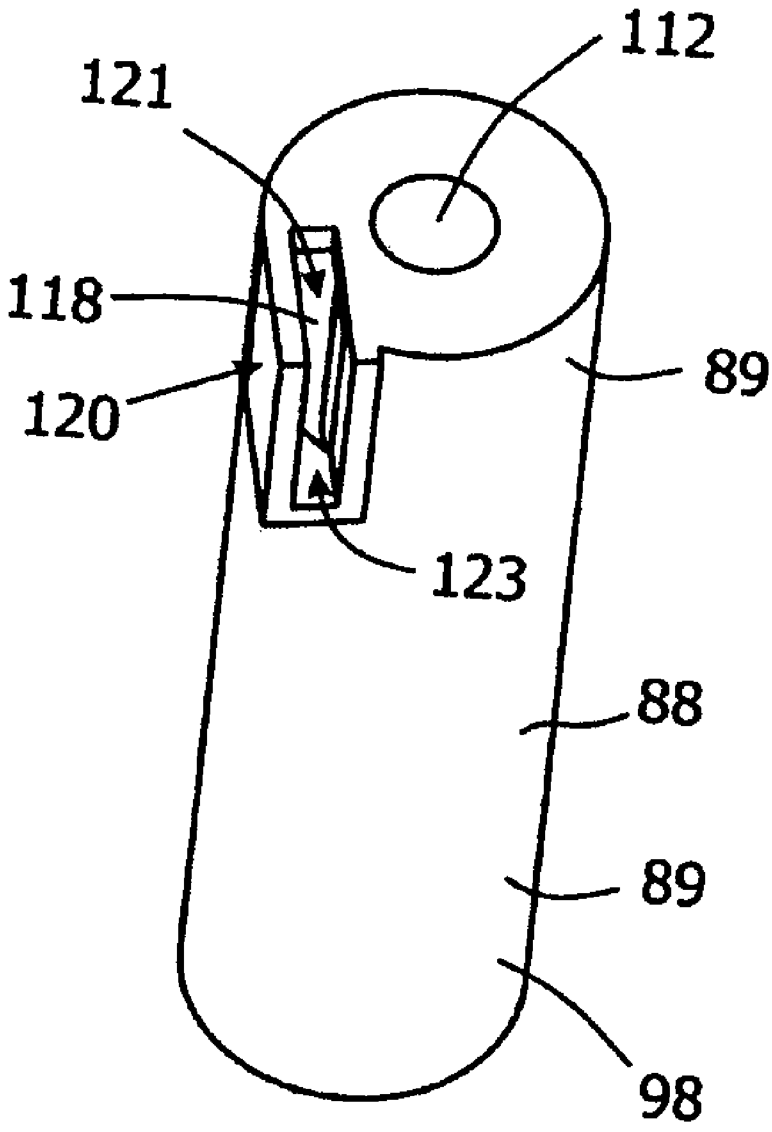
FIG. 13 is a perspective view of a single cyclone of the cyclonic array as it would look with the ribs and top plate removed.

FIG. 13 is a representational view of a single second stage cyclone 88 removed from plate 90 and the remaining cyclones 88. As shown therein, each second stage cyclone has an inlet 120, which, in the embodiment shown, is in fluid communication with open volume 93 (i.e., the space between adjacent cyclones 88). Open volume 93 is additionally in fluid communication with the air outlet 64 of second cleaning stage 44. Accordingly, open volume 93 provides an airflow passage extending to the cyclone inlets 120. Each inlet 120 has a top 121, and a side 123. In the embodiment shown, side 123 comprises a longitudinally extending opening defined in a sidewall of body 89, which extends to top 121. Top 121 defines a, e.g., rectangular opening 118, which is continuous with a rectangular opening 119 in top plate 90, shown in FIG. 8. Accordingly, in order to seal openings 118 and 119, lower surface 122 of upper cover 94 is provided with filler members 124, which are sized to be received in openings 118, 119 (e.g., rectangular as exemplified). Accordingly, upper cover 94 may be positioned so that each filler member 124 is aligned with an opening 118, 119. Upper cover 94 may then be secured to top plate 90 so that filler members 124 extend into the tops 121 of inlets 120, so as to seal the top of second stage inlets 120. Rectangular openings 118, 119 are required in order to permit inlet 120 to be molded as part of second stage cyclone 88.

It will be appreciated that the size and shape of openings 118, 119 may be varied depending upon the configuration of inlet 120. It will also be appreciated that the number of cyclones 88 in cyclonic array 86 may be varied and need not be in two concentric circular rows. It will also be appreciated that rectangular filler members 124 need not be provided as long as top plate 90 sits on the top of second stage cyclones 88 such that air will not be able to pass upwardly through plate 90 other than through outlets 64.

Accordingly, the air that exists second, upstream cyclonic stage 44 via outlet 64 travels upwardly towards the bottom of plate 90, which functions as a header to distribute the air to each of the second stage inlets 120. The air cyclones in each second stage cyclone 88, depositing dirt in second lower dirt collecting regions 108. The air then exists second stage cyclones 88 via outlets 112. In the embodiment of FIGS. 1-4, air passes from outlets 112 into down flow tube 34. In the embodiment of FIGS. 5-7, air passes from outlets 112 into airflow passage 40.

Figure 14:
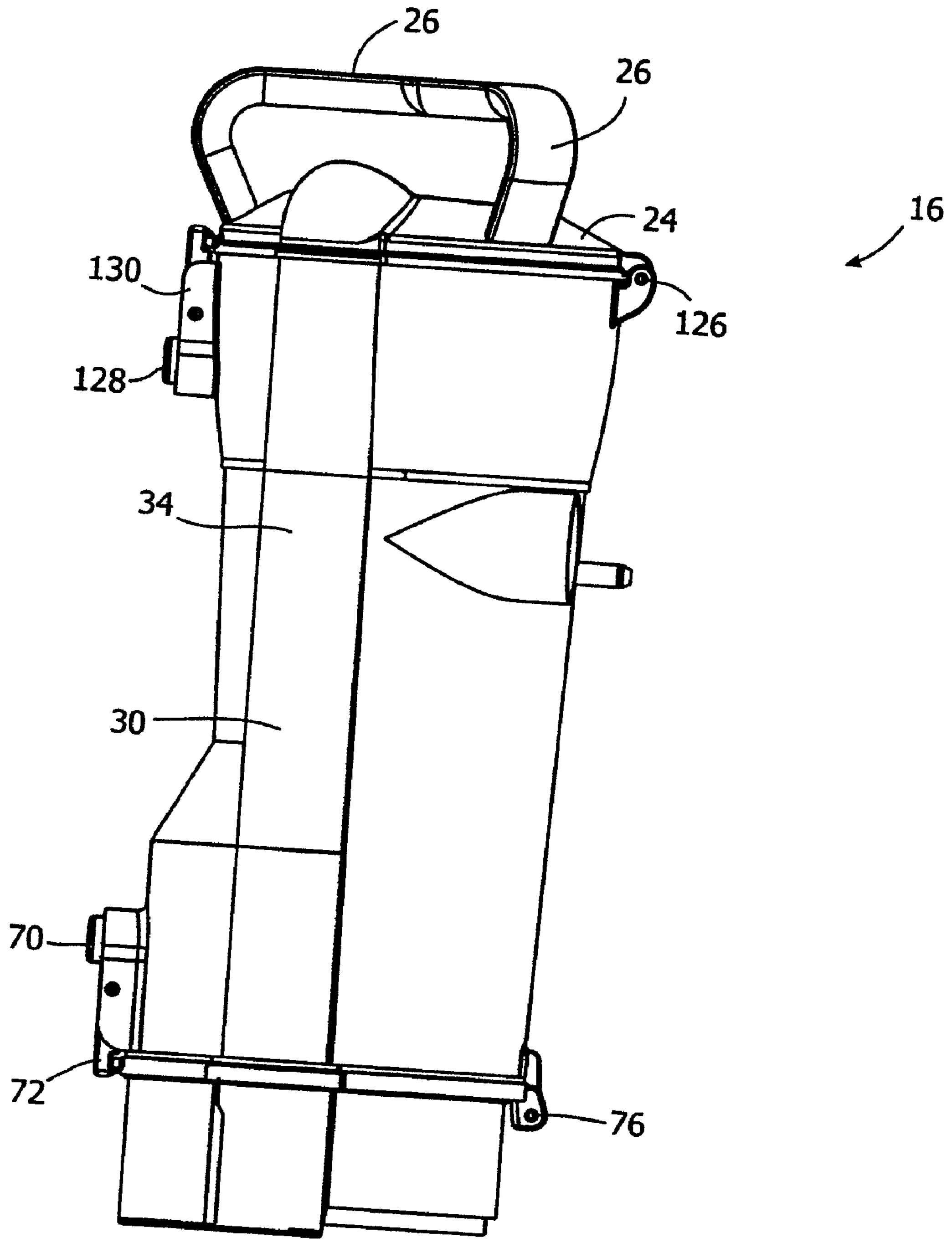
FIG. 14 is a side view of a filtration unit of the embodiment of FIG. 1; and, FIG. 15 is a perspective exploded view of the embodiment of FIG. 5, showing a lid in an open position.
Figure 15:
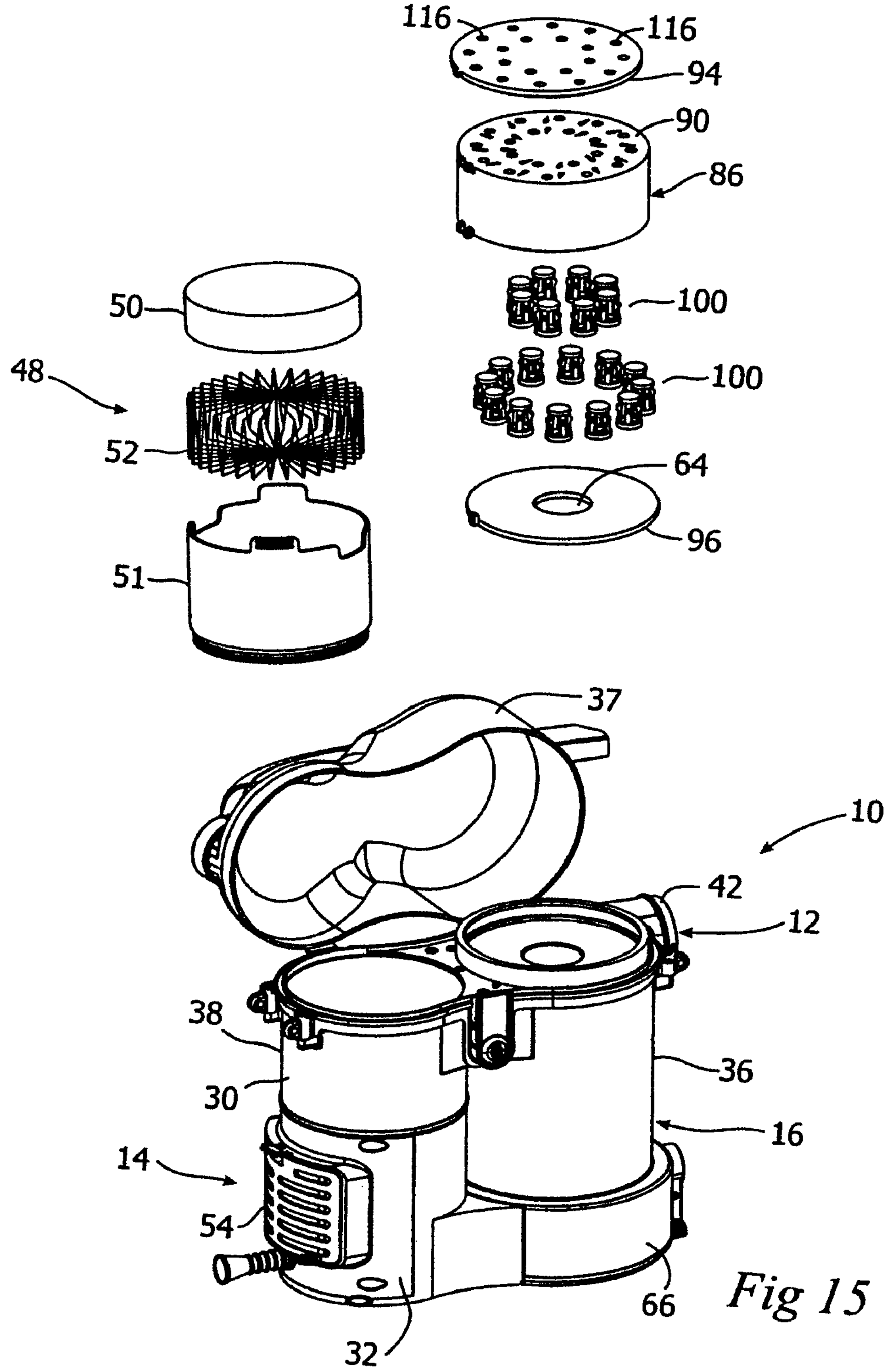

In both embodiments shown, cyclonic array 86 may be removably received in surface cleaning apparatus 10. For example, as shown in FIG. 14, top 24 is pivotally mounted via pivot pin 126. When button 128 is pressed, latch 130 moves outwardly permitting top 24 to pivot upwardly so as to expose the top of the second cyclonic stage 44. A user may then grasp cyclonic array 86 and remove it, for example, for emptying. In an alternate embodiment, it will be appreciated that a door may be provided in the side of second cyclonic stage 44. Alternatively, as shown in FIG. 15, housings 36 and 38 comprise a lid 37, which is pivotally mounted to housings 36 and 38. Accordingly, lid 37 may be opened, and the second stage may be removed for emptying or optionally replacement when it is full. Additionally, filter assembly 48, as well as other components may be removed via lid 37. Alternately, the second cyclonic stage may be emptied with the first cyclonic stage, as is known in the vacuum cleaner art.

It will be appreciated by those skilled in the art that any of the aspects of this invention may be combined in any combination or sub combinations and that not all aspects need not be incorporated into a single embodiment.

The invention claimed is:

1. A cyclonic cleaning unit comprising:

a) a plurality of cyclones integrally molded, each cyclone having a cyclone body having an upper end, a lower end, a cyclone inlet, and a cyclone outlet, each cyclone inlet having a top;

b) a separately molded upper cover mounted at the upper ends; and, c) a separately molded lower cover mounted on the lower ends wherein the upper cover has a plurality of filler members and the filler members form part of the cyclone inlets.

2. The cyclonic cleaning unit of claim 1 further comprising a plate positioned in each cyclone to define a cyclone chamber above the plate and a dirt chamber below the plate.

3. The cyclonic cleaning unit of claim 2 wherein each plate is separately manufactured and inserted into a cyclone.

4. The cyclonic cleaning unit of claim 1 wherein the lower cover is moveably mounted between a closed position and an open position.

5. The cyclonic cleaning unit of claim 1 wherein the plurality of cyclones includes an integrally molded plate positioned at the upper end of the cyclones, the plate providing a continuous surface other then the cyclone outlets and the top on the cyclone inlets, and the upper cover has openings that align with the cyclone outlets and the filler members engage the top of the cyclone inlets.

6. The cyclonic cleaning unit of claim 5 wherein each cyclone inlet comprises a longitudinally extending opening in a sidewall of the cyclone body that extends to the top of the inlet.

7. The cyclonic cleaning unit of claim 6 wherein the filler members extend into the tops of the inlets.

8. The cyclonic cleaning unit of claim 1 further comprising ribs which extend between adjacent cyclones.

9. The cyclonic cleaning unit of claim 1 wherein an open volume is provided between adjacent cyclones and the open volume comprises at least one air flow passage extending to the cyclone inlets.

10. The cyclonic cleaning unit of claim 1 wherein the lower cover closes the lower end of each cyclone.

11. A surface cleaning apparatus comprising:

a) a first cyclonic cleaning stage comprising plurality of cyclones integrally molded, each cyclone having an upper end, a lower end, a cyclone inlet, and a cyclone outlet, each cyclone inlet having a top;

a separately molded upper cover mounted at the upper ends; and, a separately molded lower cover mounted on the lower ends;

b) a second cyclonic cleaning stage upstream of the first cyclonic cleaning stage, the second cyclonic cleaning stage having a cyclone outlet and the cyclone outlet is attached to the lower cover;

c) a dirty air inlet upstream from the cyclonic cleaning stage;

d) a clean air outlet downstream from the cyclonic cleaning stage e) an air flow passage extending from the dirty air inlet to the clean air outlet and including the cyclonic cleaning stage; and, f) a suction motor.

12. The surface cleaning apparatus of claim 11 wherein the cyclone outlet is integrally molded with the lower cover.

13. The surface cleaning apparatus of claim 11 further comprising a plate positioned in each cyclone to define a cyclone chamber above the plate and a dirt chamber below the plate.

14. The surface cleaning apparatus of claim 13 wherein each plate is separately manufactured and inserted into a cyclone.

15. The surface cleaning apparatus of claim 11 wherein the lower cover is moveably mounted between a closed position and an open position.

16. The surface cleaning apparatus of claim 11 wherein the plurality of cyclones includes an integrally molded plate positioned at the upper end of the cyclones, the plate providing a continuous surface other then the cyclone outlets and the top on the cyclone inlets, and the upper cover has openings that align with the cyclone outlets and filler members that sealingly engage the top of the cyclone inlets.

17. The surface cleaning apparatus of claim 16 wherein each cyclone inlet comprises a longitudinally extending opening in a sidewall of the cyclone body that extends to the top of the inlet.

18. The surface cleaning apparatus of claim 17 wherein the filler members extend into the tops of the inlets.

19. The surface cleaning apparatus of claim 11 further comprising ribs which extend between adjacent cyclones.

20. The surface cleaning apparatus of claim 11 wherein an open volume is provided between adjacent cyclones and the open volume comprises at least one air flow passage extending to the cyclone inlets.

21. The surface cleaning apparatus of claim 11 wherein the lower cover closes the lower end of each cyclone.

* * * * *